No. 759,025. Patented May 3, 1904.

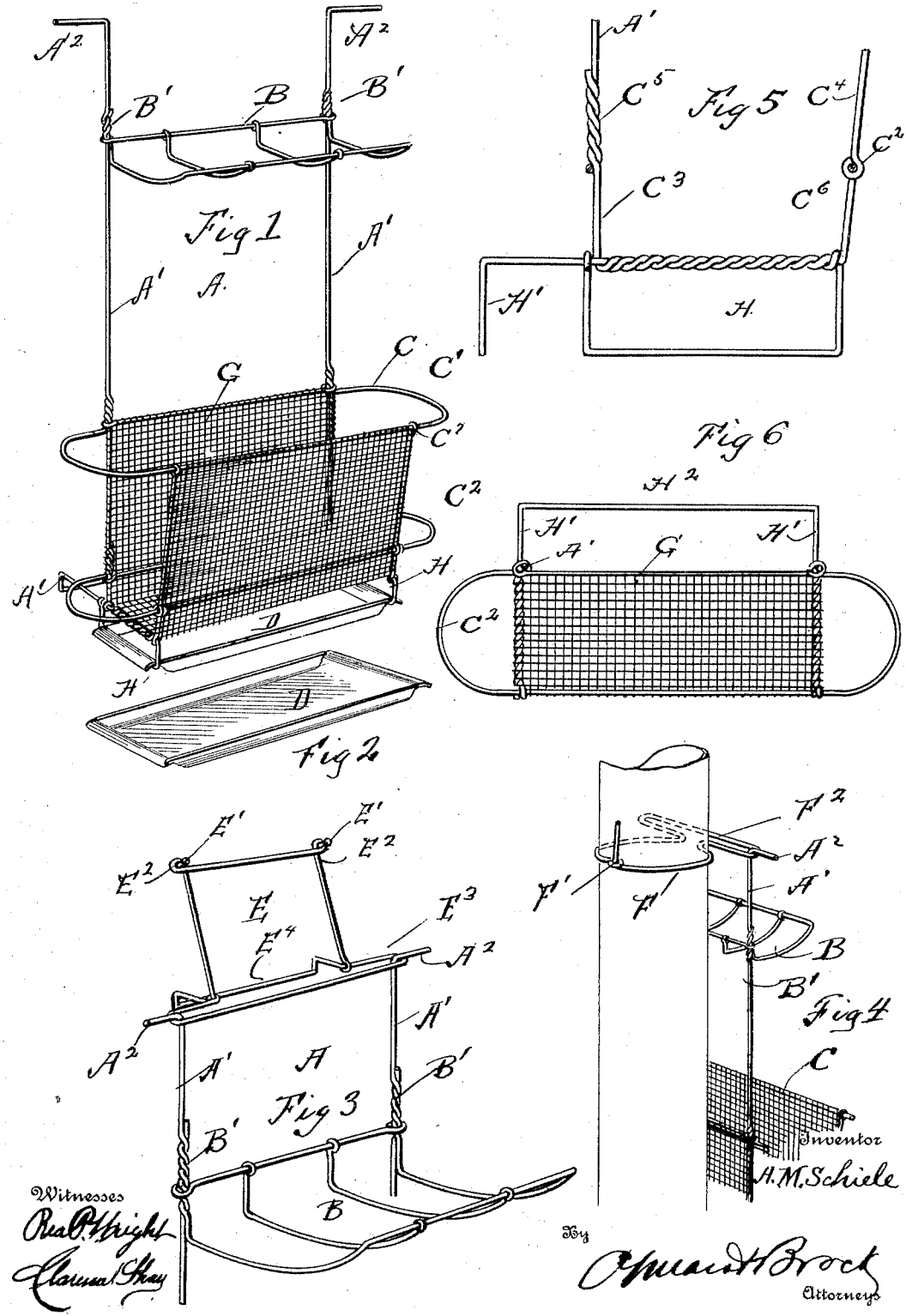

UNITED STATES PATENT OFFICE.

ANNA M. SCHIELE, OF PHILADELPHIA, PENNSYLVANIA.

RACK OR HOLDER.

SPECIFICATION forming part of Letters Patent No. 759,025, dated May 3, 1904.

Application filed August 9, 1902. Serial No. 119,126. (No model.)

*To all whom it may concern:*

Be it known that I, ANNA M. SCHIELE, a citizen of the United States, residing at Philadelphia, in the State of Pennsylvania, have invented a new and useful Rack or Holder, of which the following is a specification.

This invention is an improved construction of rack or holder particularly adapted for kitchen use, the object being to provide a rack or holder which is suspended from a stovepipe or wall at some adjacent point for the purpose of receiving and holding spoons, lids, or covers As a rule it frequently becomes necessary to remove lids or covers of the cooking utensils, and they are frequently greasy, and if they are laid down are liable to grease the object upon which they are laid, and it is with the object of avoiding these annoyances that I have devised my rack or holder; and the invention consists, essentially, of a frame having a spoon or fork supporting bracket connected thereto adjacent to its upper end and a lid or cover receptacle adjacent to its lower end and a drip-pan arranged beneath the bottom of the frame for the purpose of catching the grease or any other material which may drip from the spoons, forks, or lids.

The invention consists also in providing a removable drip-pan, so that the same can be quickly and easily cleansed.

The invention consists also in certain details of construction and novelties of combination, all of which will be fully described hereinafter and pointed out in the claims.

In the drawings forming part of this specification, Figure 1 is a perspective view of a holder constructed in accordance with my invention. Fig. 2 is a detail perspective view of the drip-pan removed from the rack or holder. Fig. 3 is a detail perspective view showing the upper portion of a rack and the manner of suspending the same from the wall. Fig. 4 is a view showing the manner of suspending the rack from the stovepipe. Fig. 5 is a detail view showing the manner of connecting the drip-pan holder to the bottom of the rack or holder and also means for holding the rack away from the wall or stovepipe. Fig. 6 is a horizontal view showing the lower portion of the holder or rack in top plan.

In carrying out my invention I employ a frame A, to the upper portion of which is attached spoon or fork holding bracket B, and to the lower end thereof is connected the basket C for receiving the lids and covers of the cooking utensils, and beneath the said basket is supported a drip-pan D. The rack and basket both project forwardly from the frame, and the pan is suspended below them, so that the rack or holder can be suspended either from the wall adjacent to the stove or from the stovepipe itself.

In Fig. 3 I have shown a hanger-frame E, which is secured to the wall by means of pins $E'$ passing through loops $E^2$, the frame having a loop $E^3$, through which the hook ends of the rack or holder are passed, this loop being held away from the wall by the rearwardly-extending portion $E^4$.

In Fig. 5 a wire hook F is passed around the stovepipe and the ends fastened by the usual hook-and-eye fastener, as shown at $F'$, and at the forward side this hook has a loop $F^2$, to which the rack is connected.

The frame A comprises the parallel members $A'$, the upper ends of which are bent horizontally in opposite directions, as the substantially hook-like form shown at A, said ends being passed through the loop of the frame E or the hood F, as the case may be.

The bracket B is located a slight distance below the upper ends of the bars $A'$ to permit of their being bent for engagement with the supporting means and is formed of wire, and its side members are twisted around the members $A'$, as most clearly shown at $B'$. The basket portion C comprises the upper oval-shaped ring $C'$, the lower oval-shaped ring $C^2$, the bottom wires $C^3$, and front wires $C^4$, said bottom wires being bent upwardly at their opposite ends, the rear ends being connected to the lower ends of the members $A'$, as most clearly shown at $C^5$. The forward ends of the wires $C^3$ and the lower ends of the front wires $C^4$ are connected to the lower ring $C^2$, and the upper ends of the front wires $C^4$ are connected to the upper ring $C'$ at $C^7$.

A piece of coarse-wire fabric G completes the basket, said wire fabric being secured to the front and bottom and rear side of the basket, leaving the ends open, as shown. By extending the ends of the rings or loops beyond the ends of the basket a convenient support is formed at each end of the basket on which articles may be hung, as for the purpose of drying them, and by locating the lower loop above the bottom of the basket the lids of other articles, which are preferably inserted through the open end of the basket, cannot roll out, and especially with lids that are so small as not to engage with the upper loop.

The drip-pan D is supported at each end by means of depending loops H, which are connected to the bottom wires of the basket, and one end is extended rearwardly, as shown at H', for the purpose of holding the entire rack away from the wall or stovepipe, and the rearwardly-extending portion H' is connected by a member $H^2$, as most clearly shown in Fig. 6. The ends of the pan are preferably provided with lips or flanges which engage with the loops H, the loops being adapted to be turned or slightly sprung outward, if necessary, to permit of the insertion or removal of the pan.

It will thus be seen that I provide a rack or holder which can be suspended adjacent to the stove for the purpose of receiving spoons and forks employed during the cooking operations and also the lids of the cooking utensils, and when so supported any grease or other material dripping from the spoons, forks, or lids will be caught in the drip-pan, which can be easily removed and cleaned. Furthermore, the entire rack is of such construction that it can be quickly and easily cleaned whenever desired. It will also be understood that I do not limit myself to the exact manner of connecting and arranging the various parts, as it is obvious that wire members constituting the parts of my invention may be connected or united in various ways.

Having thus fully described my invention, what I claim as new, and desire to secure by Letters Patent, is—

1. In a rack or holder, a frame, the upper portion of which is provided with means for supporting it and with a forwardly-extending rack, a basket at the lower end of the frame, the ends of which are open and each provided with an outwardly-extending loop, and a pan under the basket.

2. In a rack or holder, a frame, the upper portion of which is provided with means for supporting it and with a forwardly-extending rack, a forwardly-extending basket at the lower end of the frame, the ends of which are open and each provided with an upper and a lower outwardly-extending loop, the lower loop being at a short distance above the bottom of the basket, and a drip-pan below the basket.

3. In a rack or holder, a frame, the upper end of which is provided with means for supporting it and with a forwardly-extending rack, two forwardly-extending loops secured to the lower portion of the frame, the ends of which project beyond the sides of the frame, wire-netting secured to the upper loop and passed under the bottom loop and the bottom of the frame, and a pan below the netting.

ANNA M. SCHIELE.

Witnesses:
CARRIE REDEKER,
MARGARET L. WALTER.